C. F. HURLEY.
CAN OPENER.
APPLICATION FILED SEPT. 25, 1914.
1,124,449.
Patented Jan. 12, 1915.
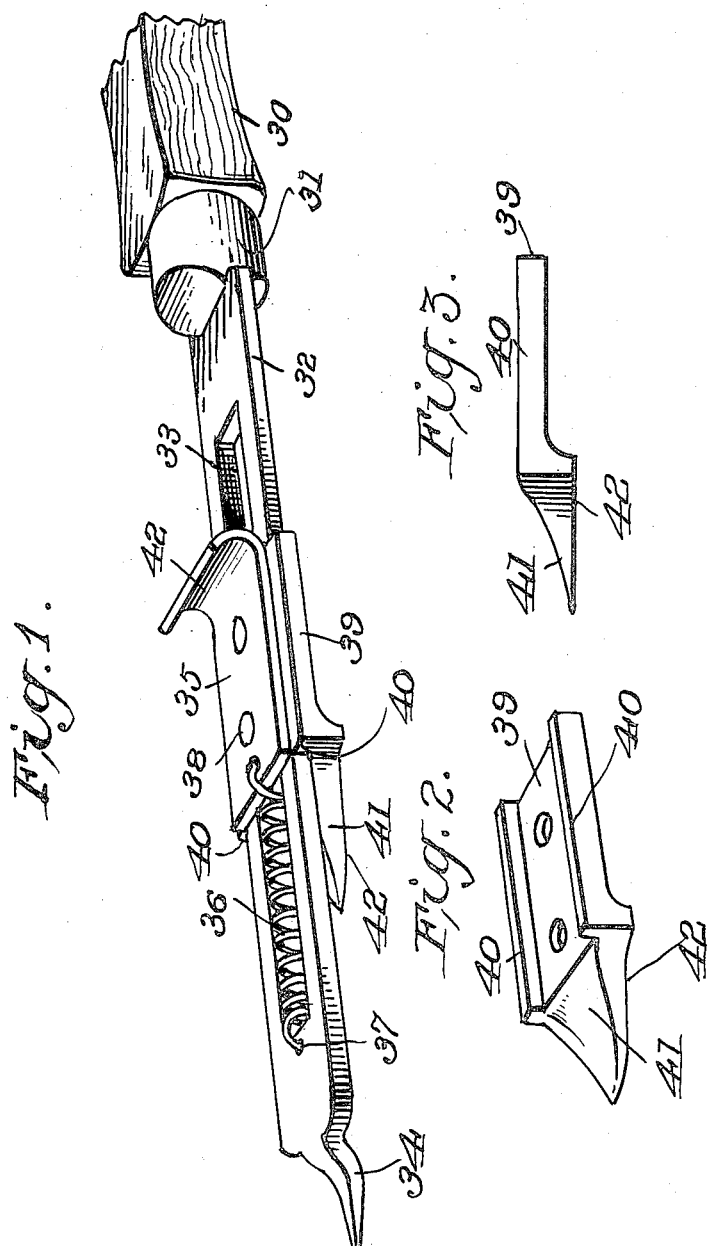

UNITED STATES PATENT OFFICE.

CORNELIUS F. HURLEY, OF MALDEN, MASSACHUSETTS.

CAN-OPENER.

1,124,449.  Specification of Letters Patent.  Patented Jan. 12, 1915.

Application filed September 25, 1914. Serial No. 863,510.

*To all whom it may concern:*

Be it known that I, CORNELIUS F. HURLEY, a citizen of the United States, residing at Malden, in the county of Middlesex and State of Massachusetts, have invented certain new and useful Improvements in Can-Openers; and I do hereby declare the following to be a full, clear, and exact description of the invention, such as will enable others skilled in the art to which it appertains to make and use the same.

This invention relates to can openers, and the primary object of the invention is the provision of a can opener which has a channeled plate slidably mounted upon the under surface of the main supporting plate thereof, which channeled plate carries a cutting knife for insertion into the side of a can, and to associate with said plate certain means for automatically drawing the plate toward the outer end of the supporting plate for inserting the knife into the side of a can.

Another object of this invention is to provide a plate for attachment to said channeled plate which has one end thereof rolled upwardly for forming a hand rest, and to attach a spiral spring to said plate which has its end rolled upwardly for drawing the inserting point of the cutting blade into the side of a can.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a perspective view of a modified form of the can opener. Fig. 2 is a detail perspective view of the cutting blade of the modified form of the can opener, and Fig. 3 is a side elevation of Fig. 2.

Referring more particularly to the drawings, the numeral 30 designates a handle which has a ferrule 31 mounted upon the reduced end thereof. The ferrule 31 and the handle 30 has a plate 32 connected thereto which extends longitudinally from the handle. The plate 32 is provided with a longitudinally extending slot 33 formed centrally therein, and also with a pointed inserting end 34 upon its outer terminal end. The pointed inserting end 34 is bent downwardly as is clearly shown in Fig. 1 of the drawings and is provided for insertion into a can.

The plate 32 has slidably mounted thereon, a plate 35, which plate has one end of a spiral spring 36 secured thereto. The spiral spring 36 is positioned within the slot 33 and it has its end which is free from connection with the plate 35 inserted in an opening 37 which is formed in the plate 32. The spring 36 tends to draw the plate 35 outwardly toward the inserting point 34.

The plate 35 is connected, by means of rivets or other similar fastening means 38 with a second plate 39. The plate 39 has upstanding flanges 40 formed upon its marginal side edges which engage against the edges of the plate 32, for properly guiding sliding movement of the plates 35 and 39 longitudinally upon the plate 32. The plate 39 is positioned upon the opposite side of the plate 32 from the plate 35 and it has a cutting blade 41 formed integrally therewith and projecting forwardly therefrom. The cutting blade 41 tapers to a cutting edge from the edge of the plate 39 and it has a cutting edge formed along one side thereof as is indicated at 42 in Fig. 2 of the drawings.

The plate 35 has one end thereof rolled upwardly as is shown at 42 to provide a finger gripping portion for moving the plates 35 and 39 rearwardly upon the plate 32 against the tension of the spring 36.

In the operation of the modified form of can opener, when it is desired to cut the top from the can, the point 34 is inserted centrally in the top of the can and the plates 35 and 39 are drawn to the limit of their movement upon the plate 32 after which they are released and the spring 36 draws the plates and the cutting blade 41 toward the inserting point, forcing the inserting point through the sides of the can which is to be opened. After the blade 41 has been properly inserted into and through the side of the can, a rotary movement about the can is imparted to the opener which cleanly cuts the top from the can.

From the foregoing description taken in connection with the accompanying drawings the advantages of the construction and of the method of operation of the improved can opener will be readily apparent to those skilled in the art to which this invention appertains and, while in the foregoing description, the principle of the operation of the invention has been described together with various features of construction, it is to be understood that certain minor features of construction, combination and arrangement of parts may be altered to suit practical conditions provided such alterations are comprehended within the scope of what is claimed.

What is claimed is:—

1. In a can opener, a handle, a plate carried by said handle, an inserting point formed integrally with the outer end of said handle, said plate being provided with a longitudinally extending slot, a plate mounted upon the upper side of said first named plate and having one end thereof, rolled upwardly, a cutting knife carrying plate slidably mounted upon the under surface of said first named plate and connected to said second named plate for synchronous movement therewith, a cutting knife formed integrally with said cutting knife carrying plate, and a contracting spiral spring mounted in said slot and connected to said first and second named plates for moving said second named plate and said cutting blade carrying plate toward said inserting point.

2. In a can opener, a plate having a handle secured to one end thereof, an inserting point formed upon the other end of said plate, said plate being provided with a longitudinally extending slot, a channeled plate slidably mounted upon the under surface of said first named plate and receiving the same in its channels, a cutting blade formed integrally with and projecting forwardly from said channeled plate, and means for automatically drawing said blade carrying plate toward said inserting point for insertion into the side of a can.

3. In a can opener, a handle, a plate secured to one end of said handle, said plate being provided with longitudinally extending slots, a channeled plate slidably mounted upon the under surface of said first named plate and receiving the same in its channels, a cutting blade formed integrally with and projecting forwardly from said channeled plate for insertion into the side of a can, a second plate mounted upon the upper surface of said first named plate and secured to said channeled plate in any suitable manner, said second named plate having one end thereof rolled upwardly for forming a handle portion for moving said channeled plate and said cutting knife longitudinally about said first named plate.

In testimony whereof I affix my signature in presence of two witnesses.

CORNELIUS F. HURLEY.

Witnesses:
S. E. LEONARD,
W. G. SAUNDERS.